United States Patent
Ueda et al.

(10) Patent No.: US 7,311,984 B2
(45) Date of Patent: Dec. 25, 2007

(54) FUEL CELL SYSTEM

(75) Inventors: Kenichiro Ueda, Saitama (JP); Koichiro Miyata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 494 days.

(21) Appl. No.: 11/053,694

(22) Filed: Feb. 7, 2005

(65) Prior Publication Data

US 2005/0227131 A1    Oct. 13, 2005

(30) Foreign Application Priority Data

Apr. 13, 2004    (JP)    ............................. 2004-117841

(51) Int. Cl.
   *H01M 8/00*    (2006.01)
   *H01M 8/03*    (2006.01)
   *B60K 1/00*    (2006.01)

(52) U.S. Cl. ............................. 429/13; 429/24; 429/26; 180/65.3

(58) Field of Classification Search .................. 429/13, 429/24, 26; 180/65.3
See application file for complete search history.

(56) References Cited

U.S. PATENT DOCUMENTS 6,632,552 B2 * 10/2003 Yamanashi ................... 429/17
6,994,931 B2 * 2/2006 Ichikawa et al. ............. 429/22

FOREIGN PATENT DOCUMENTS

JP    08-195208    7/1996
JP    2003-182379    7/2003

* cited by examiner

*Primary Examiner*—Patrick Joseph Ryan
*Assistant Examiner*—Thomas H. Parsons
(74) *Attorney, Agent, or Firm*—Fish & Richardson P.C.

(57) ABSTRACT

A fuel cell system of the present invention is mounted on a moving object and is equipped with a fuel cell for generating power by chemically reacting a fuel gas supplied to an anode and an oxidizer gas supplied to a cathode; a cooling mechanism for cooling the fuel cell by radiating heat of a refrigerant circulating in the fuel cell into an atmosphere; a speed detection mechanism for detecting a moving speed of the moving object; an outside air temperature detection mechanism for detecting an outside air temperature; a cooling amount estimation mechanism for estimating a cooling amount of the fuel cell by the cooling mechanism, based on the moving speed and the outside air temperature; and an upper limit value set mechanism for setting an upper limit value of a power generation current, based on an estimation result of the cooling amount estimation mechanism.

4 Claims, 4 Drawing Sheets

FUEL CELL SYSTEM

BACKGROUND OF THE INVENTION

1. Field of the Invention

The present invention relates to a fuel cell system for a moving object that enables an operation of a fuel cell in a range of overheat not occurring in the fuel cell, even when a temperature detection mechanism of a cooling system malfunctions.

2. Description of the Related Art

These years from such a viewpoint of suppressing a discharge amount of carbon dioxide that causes global warming is noticed a fuel cell electric vehicle (FCEV). The FCEV mounts a fuel cell (FC) for generating power by electrochemically reacting hydrogen ($H_2$) and oxygen ($O_2$) in air, supplies the power generated by the fuel cell to a traction motor, and produces driving force.

In this connection, the fuel cell becomes highest in its power generation performance (electromotive force) by a temperature thereof being maintained at a predetermined value (for example, 80 degrees Celsius): if the temperature is too low, the power generation performance lowers; and if too high, there occurs a possibility that a fuel cell main body and instruments (piping, valve, and the like) receive heat damage. Therefore, a technology is known that detects a temperature (cooling water temperature), cooling water amount, and the like of the fuel cell by a water temperature sensor and a flow rate sensor, wherein when each value is deviated from a predetermined range, a controller reduces an output of the fuel cell main body by compensation control (for example, see paragraphs 0020 and 0021 and FIG. 1 of Japanese Patent Laid-Open Publication Hei. 8-195208 (hereinafter referred to as patent document 1)). Meanwhile, the FCEV leads cooling fluid circulating within the fuel cell to an radiator placed at a front area of a vehicle body and performs cooling by running wind (for example, see paragraphs 0037 and 0042 and FIG. 1 of Japanese Patent Laid-Open Publication No. 2003-182379).

However, in the apparatus of the patent document 1, when there occur a malfunction of a water temperature sensor, a disconnection of an electric harness connected to the water temperature sensor, and the like, compensation control based on a cooling fluid temperature results in being not correctly performed and there is a possibility that following problems occur: For example, if the controller recognizes the cooling fluid temperature lower than actual one, an output (power generation current) results in being not limited in spite of the fuel cell temperature being high, and it may happen that an excessive temperature rise occurs in the fuel cell. In addition, if the controller recognizes the cooling fluid temperature higher than actual one, the output is reduced in spite of the fuel cell temperature being an adequate value, and it may happen that the output is gradually reduced and the FCEV results in being unable to run.

Consequently, a fuel cell system is strongly requested that estimates a cooling amount of a fuel cell by a cooling mechanism from a running speed of a moving object and an outside air temperature and sets an upper limit value of a power generation current of the fuel cell based on the cooling amount.

SUMMARY OF THE INVENTION

A first aspect of the present invention to solve the problems described above is a fuel cell system mounted on a moving object, and the system comprises a fuel cell for generating power by chemically reacting a fuel gas supplied to an anode and an oxidizer gas supplied to a cathode; a cooling mechanism for cooling the fuel cell by radiating heat of a refrigerant circulating in the fuel cell into an atmosphere; a speed detection mechanism for detecting a moving speed of the moving object; an outside air temperature detection mechanism for detecting an outside air temperature; a cooling amount estimation mechanism for estimating a cooling amount of the fuel cell by the cooling mechanism, based on the moving speed and the outside air temperature; and an upper limit value set mechanism for setting an upper limit value of a power generation current, based on an estimation result of the cooling amount estimation mechanism.

In accordance with the first aspect of the fuel cell system, if the outside air temperature is lower and the moving speed is higher, a result of the cooling amount estimation becomes larger, and the upper limit value of the power generation current is set higher; on the other hand, if the outside air temperature is higher and the moving speed is lower, a result of the cooling amount estimation becomes smaller, and the upper limit value of the power generation current is set lower.

In addition, a second aspect of a fuel cell system of the present invention is, in the first aspect of the fuel cell system, the system that comprises a refrigerant temperature detection mechanism for detecting a temperature of a refrigerant at a refrigerant flow passage, where the refrigerant passes; and estimates the cooling amount, based on an estimation result of the cooling amount estimation mechanism, when the refrigerant temperature detection mechanism malfunctions.

In accordance with the second aspect of the fuel cell system, in a normal operation an upper limit value of a power generation current is set based on the estimation result of the cooling amount estimation mechanism; and in a malfunction of the refrigerant temperature detection mechanism and the like the upper limit value of the power generation current is set based on the estimation result of the cooling amount.

In accordance with the first aspect of the fuel cell system, the upper limit value of the power generation current can be set without using a refrigerant temperature detection mechanism such as a water temperature sensor. In addition, in accordance with the second aspect of the fuel cell system, even if the refrigerant temperature detection mechanism and the like malfunction, an operation is enabled in a range of heat damage and the like not occurring in the fuel cell.

DESCRIPTION OF THE PREFERRED EMBODIMENTS

Here will be described an embodiment in detail where the present invention is applied to a fuel cell electric automobile, referring to drawings as needed.

Figure 1:
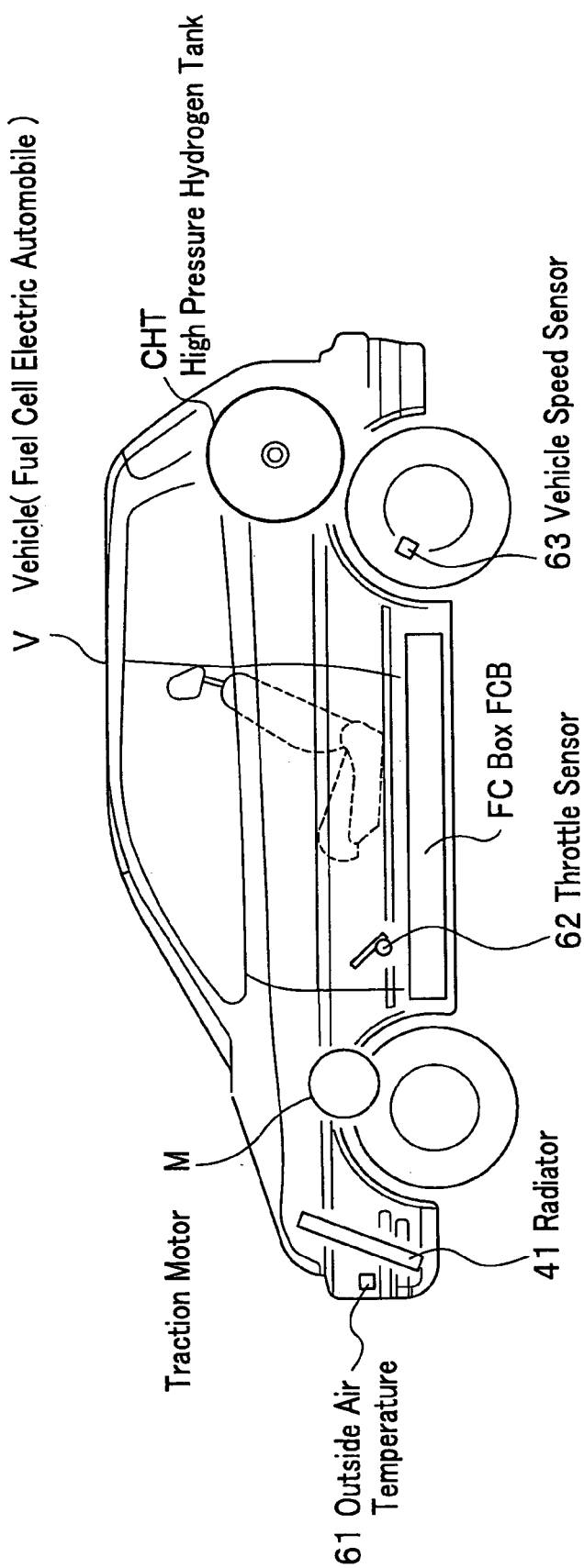
FIG. 1 is a partial perspective side view of a vehicle where a fuel cell system related to an embodiment of the present invention is mounted.
Figure 2:
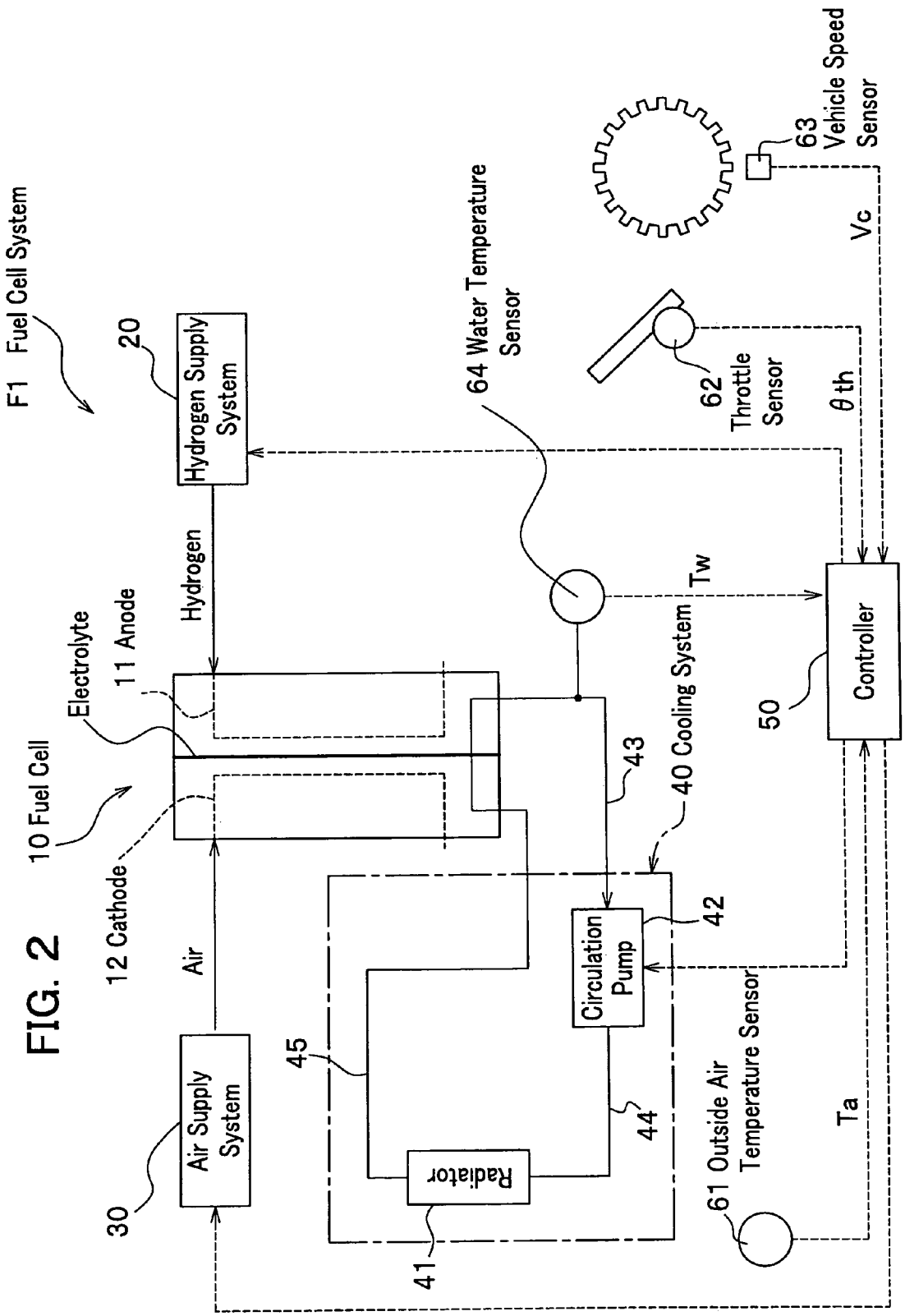
FIG. 2 is a block configuration diagram of a fuel cell system related to an embodiment of the present invention.

FIG. 1 is a partial perspective side view of a vehicle where a fuel cell system related to an embodiment of the present invention is mounted; FIG. 2 is a schematic configuration diagram of the fuel cell system related to the embodiment of the present invention.

[Vehicle Configuration]

Firstly will be described a vehicle. In a vehicle V shown in FIG. 1, an FC box FCB is mounted under a floor of a passenger's seat and a fuel cell 10 is housed in the FC box FCB (see FIG. 2). In addition, a traction motor M is mounted on a front area and a high pressure hydrogen tank CHT is horizontally mounted above rear wheels of the vehicle V. In addition, the vehicle V comprises a radiator 41 for radiating heat in a fuel cell cooling loop at a vehicle body front area and an outside air temperature sensor (outside air temperature detection mechanism) 61 for detecting an outside air temperature Ta; a driving seat comprises a throttle sensor 62 for detecting a throttle pedal tramp-on amount θth; and a vehicle rear area comprises a vehicle speed sensor (speed detection mechanism) 63 for detecting a vehicle speed Vc. Meanwhile, the vehicle speed sensor 63 detects a rear wheel speed as the vehicle speed Vc and is provided, for example, for controlling an ABS (Anti-lock Brake System) system.

The fuel cell 10 generates power by electrochemically reacting oxygen in air and hydrogen, and the electric power generated is supplied to the traction motor M and runs the vehicle V. In this connection, the fuel cell 10 here is a fuel cell of a PEM type of a solid polymer and has a stack structure of, for example, several tens to several hundreds of single cells being stacked, and which single cell further sandwiches by a separator an MEA configured of an anode, a cathode, and the like with sandwiching an electrolyte (here described not shown). Here, the PEM is an abbreviation of Proton Exchange Membrane, and the MEA is an abbreviation of Membrane Electrode Assembly.

[Fuel Cell System Configuration]

Next will be described a fuel cell system F1, referring to FIG. 2. The fuel cell system F1 of a first embodiment comprises the fuel cell 10, a hydrogen supply system 20, an air supply system 30, a cooling system (cooling mechanism) 40, and a controller 50.

The fuel cell 10 is a fuel cell of the PEM type having an anode 11, a cathode 12, and an electrolyte 13 as described above; hydrogen (anode gas) of a fuel gas is supplied to the anode 11 from the hydrogen supply system 20; air (cathode gas) of an oxidizer gas is supplied to the cathode 12 from the air supply system 30; and thereby the fuel cell 10 generates power. Electric power generated by the fuel cell 10 is supplied to loads such as the traction motor M (see FIG. 1) and auxiliaries.

The hydrogen supply system 20 supplies hydrogen as the anode gas to the anode 11 of the fuel cell 10 and comprises a high pressure hydrogen tank, a pressure reduction valve, and the like not shown. In addition, the air supply system 30 supplies air as the cathode gas to the fuel cell 10 and comprises an air cleaner, a humidifier, an electric compressor, and the like not shown.

The cooling system 40 radiates heat, which the fuel cell 10 produces with accompanying a power generation, in an atmosphere and comprises the radiator 41, a circulation pump 42, cooling fluid pipings (refrigerant flow passages) 43 to 45, and the like. The cooling system 40 uses cooling fluid (anti-freeze fluid) as a heat medium, and a temperature (cooling fluid temperature) Tw of the cooling fluid is detected by a water temperature sensor (refrigerator temperature detection mechanism) 64 additionally provided at the cooling piping 43 between the fuel cell 10 and the circulation pump 42.

[Action of Embodiment]

If the fuel cell system F1 is activated, the controller 50 decides a target current value Itgt of the fuel cell 10, based on the throttle pedal tramp-on amount θth detected by the throttle sensor 62, consumption electric power of various instruments (light, air conditioner, and the like), and the like; and then the controller 50 drives and controls the hydrogen supply system 20 and air supply system 30 in order to supply the anode gas and cathode gas depending on the target current value Itgt. Thus to the fuel cell 10 is supplied each predetermined amount of the anode gas and cathode gas, and a current occurs accompanied with a hydrogen movement from the anode 11 to the cathode 12. In addition, if the cooling fluid temperature Tw detected by the water temperature sensor 64 reaches a predetermined upper fluid temperature Twmax, the controller 50 determines that the fuel cell 10 becomes overheated and reduces the target current value Itgt (that is, supply amounts of the anode gas and cathode gas) according to a predetermined procedure. As a result, an output (power generation) of the fuel cell 10 is suppressed, and thus a temperature of the fuel cell 10 lowers.

Figure 3:
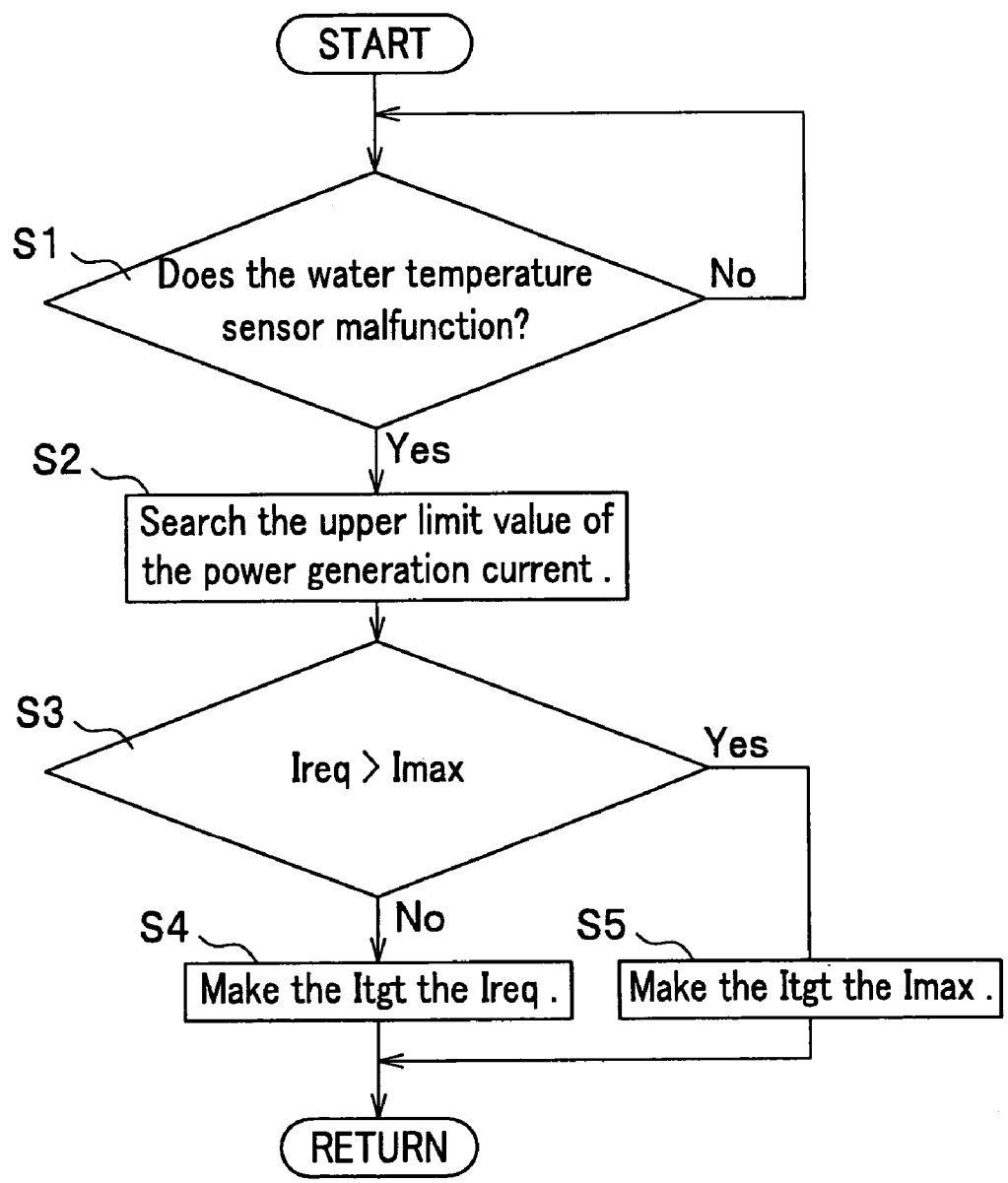
FIG. 3 is a flowchart showing a procedure of a power generation limit in an embodiment of the present invention.

On the other hand, the controller 50 performs a power generation limit shown in the flowchart of FIG. 3 in parallel to normal power generation control. The controller 50 firstly determines in a step S1 of FIG. 3 whether or not the water temperature sensor 64 malfunctions. The determination is performed based on an operation state of the fuel cell 10 and a detection result of the water temperature sensor 64; and if a detection result of the water temperature sensor 64 does not change in spite of the operation state of the fuel cell 10 largely changing and the cooling fluid temperature Tw, which ought to ascend (or descend), the controller 50 determines that there have occurred a malfunction of the water temperature sensor 64, a disconnection of an electric harness connected to the water temperature sensor 64, and the like. Meanwhile, if the determination of the step S1 is No, the controller 50 returns to the step S1 and repeats the determination.

Figure 4:
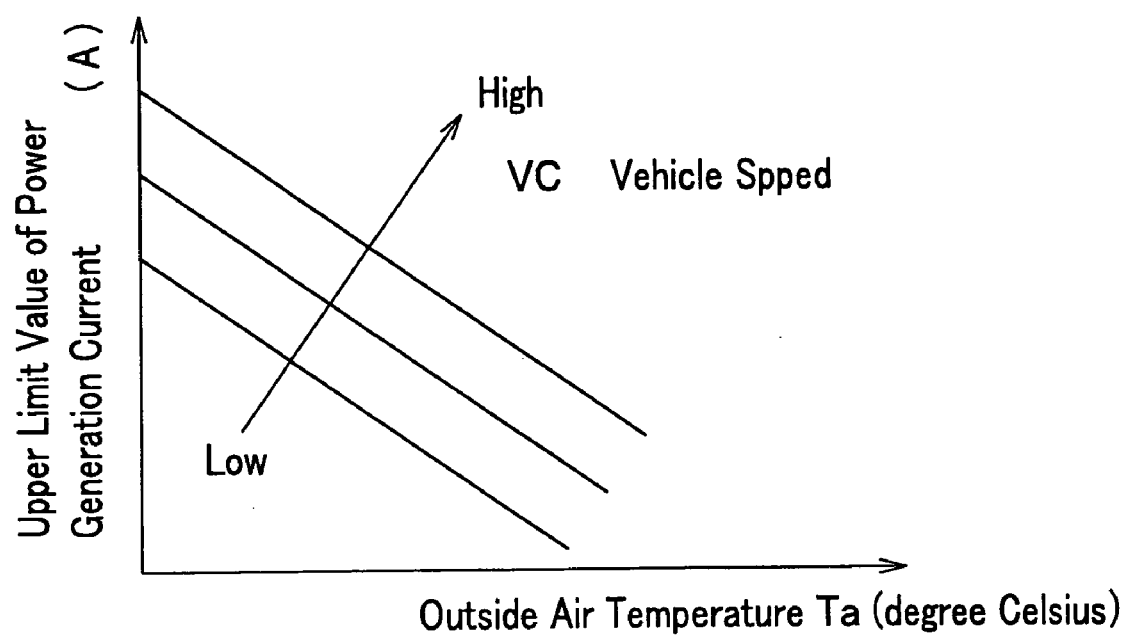
FIG. 4 is a map for obtaining an upper limit value of a power generation current from an outside air temperature and a vehicle speed.

If the determination of the step S1 is Yes, the controller 50 searches a power generation upper limit value Imax from the map of FIG. 4, based on the outside air temperature Ta detected by the outside air temperature sensor 61 and the vehicle speed Vc detected by the vehicle speed sensor 63. The power generation upper limit value Imax is a limit value where the fuel cell 10 can generate power in a range of not becoming not less than a predetermined temperature (heat-resistance temperature of an ion exchange composition contained in the electrolyte 13 and the like: for example, 90 degrees Celsius) when a cooling amount (heat radiation amount of the radiator 41) of the fuel cell 10 by the cooling system 40 becomes a certain value. The map is made by performing a bench test, a running test, and the like, using an actual vehicle. As shown in FIG. 4, the power generation upper limit value Imax becomes higher as the outside air temperature Ta becomes lower; and the Imax becomes higher as the vehicle speed Vc becomes higher. This is because the larger a difference between the cooling fluid temperature Tw and the outside air temperature Ta becomes and the higher the vehicle speed Vc becomes, a heat amount (that is, a cooling amount of the fuel cell 10 by the cooling system 40) radiated from the radiator 41 becomes larger.

Next the controller 50 determines in a step S3 whether or not a request current amount Ireq exceeds the power generation upper limit value Imax. And if the determination of the step S3 is No, the controller 50 makes in a step S4 the request current amount Ireq the target current amount Itgt as it is and supplies the anode gas and the cathode gas to the fuel cell 10, depending on the target current amount Itgt.

On the other hand, if the request current amount Ireq exceeds the power generation upper limit value Imax and the determination of the step S3 is Yes, the controller 50 makes in a step S5 the power generation upper limit value Imax the target current amount Itgt and supplies the anode gas and the cathode gas to the fuel cell 10, depending on the target current amount Itgt.

In the fuel cell system F1 of the embodiment it becomes enabled to operate the fuel cell 10 at an appropriate power generation current even in the malfunction of the water temperature sensor 64 by performing such the power generation limit, to prevent the overheat of the fuel cell 10, and to prevent a problem from occurring that the vehicle V becomes unable to run due to an output limit of the vehicle V where the fuel cell 10 is mounted.

The present invention can be widely and variably performed without being limited to the embodiment. For example, although the embodiment performs the power generation limit of FIG. 3 in a malfunction of a water temperature sensor, it may be designed so to omit the water temperature sensor from the fuel cell system and to perform the power generation limit based on an outside air temperature and a vehicle speed even in a normal operation. In addition, although the embodiment is designed to set an upper limit value of a target power generation current amount, it may set an upper limit value picked up from the fuel cell based on the outside air temperature and the vehicle speed. In addition, although the embodiment describes a fuel cell electric automobile as an example, the present invention is applicable to a fuel cell system mounted on a moving object such as a ship. In addition, although the embodiment picks up a fuel cell system comprising the fuel cell of the PEM type, of course the present invention is applicable to a fuel cell system comprising another kind of a fuel cell such as an alkaline fuel cell and a phosphoric acid fuel cell. In addition, starting from a layout of each instrument configuring a fuel cell system, a concrete procedure of a power generation limit and the like are also appropriately changeable without departing the spirit and scope of the invention.

What is claimed is:

1. A fuel cell system mounted on a moving object, the system comprising:
   a fuel cell for generating power by chemically reacting a fuel gas supplied to an anode and an oxidizer gas supplied to a cathode;
   a cooling mechanism for cooling said fuel cell by radiating heat of a refrigerant circulating in the fuel cell into an atmosphere;
   a speed detection mechanism for detecting a moving speed of said moving object;
   an outside air temperature detection mechanism for detecting an outside air temperature;
   a cooling amount estimation mechanism for estimating a cooling amount of said fuel cell by said cooling mechanism, based on said moving speed and said outside air temperature; and
   an upper limit value set mechanism for setting an upper limit value of a power generation current, based on an estimation result of said cooling amount estimation mechanism.

2. A fuel cell system according to claim 1 that comprises a refrigerant temperature detection mechanism for detecting a temperature of said refrigerant at a refrigerant flow passage, where the refrigerant passes; and estimates said cooling amount, based on an estimation result of said cooling amount estimation mechanism, when the refrigerant temperature detection mechanism malfunctions.

3. An operation method of a fuel cell system mounted on a moving object, the method comprising the steps of:
   generating power by chemically reacting a fuel gas supplied to an anode and an oxidizer gas supplied to a cathode in a fuel cell;
   cooling said fuel cell by radiating heat of a refrigerant circulating in the fuel cell into an atmosphere;
   detecting a moving speed of said moving object;
   detecting an outside air temperature;
   estimating a cooling amount of said fuel cell by cooling said fuel cell, based on said moving speed and said outside air temperature; and
   setting an upper limit value of a power generation current, based on an estimation result of said fuel cell.

4. An operation method of a fuel cell system mounted on a moving object according to claim 3, the method comprising the steps of:
   detecting a temperature of said refrigerant at a refrigerant flow passage where the refrigerant passes; and
   estimating said cooling amount, based on an estimation result of said fuel cell, when the step of detecting the temperature of said refrigerant malfunctions.

* * * * *